March 1, 1955

R. B. SEYMOUR ET AL 2,703,299

METHOD OF LINING A TANK

Filed Sept. 10, 1953

INVENTORS.
RAYMOND B. SEYMOUR
ROBERT H. STEINER
BY

ATTORNEYS

United States Patent Office 2,703,299
Patented Mar. 1, 1955

2,703,299

METHOD OF LINING A TANK

Raymond B. Seymour and Robert H. Steiner, Allentown, Pa., assignors to The Atlas Mineral Products Company of Pennsylvania, Mertztown, Pa., a corporation of Pennsylvania Application September 10, 1953, Serial No. 379,436

1 Claim. (Cl. 154—82)

This invention relates to a lining and, more particularly, relates to a synthetic resin lining for tanks or the like. The lining of this invention has particular utility for the protection of metal and concrete tanks from the fumes of various acids and solvents. In particular, the lining in accordance with this invention has found great utility in protecting tanks from oxidizing acids, such as chromic and nitric acids.

In accordance with this invention the lining is formed from preformed sheets of polyvinyl chloride which is preferably plasticized. The sheets are joined together through the use of a plastigel. Contrary to conventional techniques, the polyvinyl chloride sheets are skived along their adjoining edges so as to form a V having its apex against the tank for the reception of the plastigel. The V is then filled with a plastigel and the plastigel heated with a suitable source of heat so that it is fused. If necessary to provide a smooth monolithic surface, a second application of the plastigel may be made.

Polyvinyl chloride is well known to the art. Well known plasticizers for polyvinyl chloride are tricresyl phosphate, dibutyl phthalate and dioctyl phthalate, dioctyl adipate, etc. and may be added to polyvinyl chloride within a wide range of from about 5 to 70%. Such plasticized polyvinyl chlorides are well known to the art and are prepared by mixing the plasticizer with polyvinyl chloride on a mill or in a mixer, such as a Banbury mixer. This mixture can then be calendered into thin sheets about 10–25 mils., the sheets plied up to various thicknesses and formed into a uniform thick sheet by pressing between hot platens.

Plastigels useful in accordance with this invention are known to the art and are vinyl resin plastisols, i. e., a vinyl resin dispersed in a liquid plasticizer, to which a gelling agent, such as metallic soap, has been added. By way of example, the vinyl resin may be polyvinyl chloride or a copolymer of vinyl chloride and vinyl acetate or vinylidene chloride in which the former is the major component, and the plasticizer, which will be present in an amount of from 55% to 150% by weight of the vinyl resin, may be, for example, dioctyl phthalate, tricresyl phosphate, dioctyl adipate, etc. The gelling agent may be, for example, a soap such as aluminum laurate, aluminum di-2-ethylhexanoate, aluminum stearate, magnesium stearate, napalm, a colloidal silica or an organophilic bentonite. For further information, reference may be had to the articles "And now the 'plastigels'" found on page 99 of "Modern Plastics," January 1952, and "It's done with plastisols" found at page 87 of "Modern Plastics," December 1951, also "Metallic soaps such as gelling agents for plastigels," "Modern Plastics," February 1953.

The invention will be further clarified from a reading of the following description in conjunction with the drawings, in which.

Figure 1:
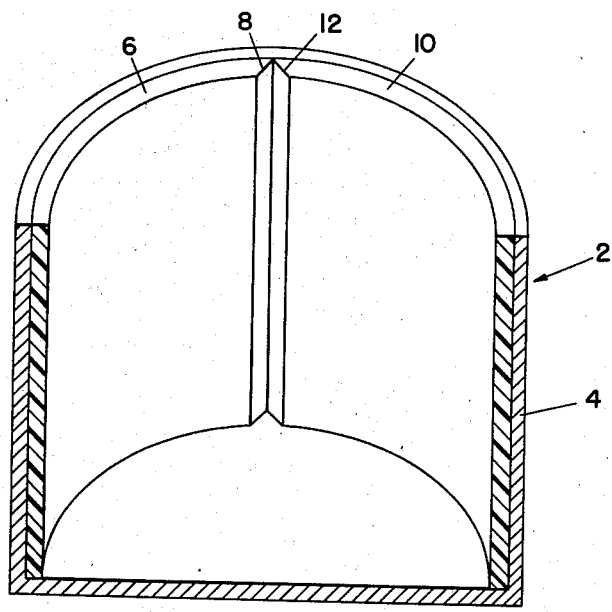
Figure 1 is a perspective view of a tank (partially broken away) in accordance with this invention.
Figure 2:
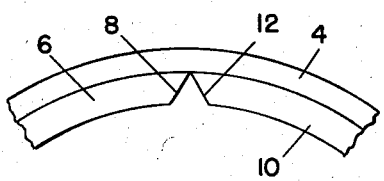
Figure 2 is a horizontal sectional view of the junction of the two lining sheets shown in Figure 1 without plastigel.

As shown in Figure 1, a tank 2 comprises a metal shell 4. A plasticized polyvinyl chloride sheet 6 is skived along a vertical edge at 8 and adjoins a plasticized polyvinyl chloride sheet 10 skived along a vertical edge at 12. Sheets 6 and 10 are stitched to the shell 4 in a conventional manner with a serrated roller. As seen more clearly in Figure 2, the skived adjoining sheets form a V.

Figure 3:
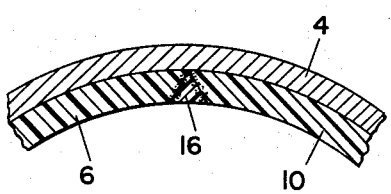
Figure 3 is a horizontal sectional view of the junction of the two lining sheets shown in Figure 1 with plastigel.

As shown in Figure 3, the V portion between the sheets 6 and 10 is filled with a plastigel 16, which is set by heating in situ at a temperature within the range of 135° C. to 215° C. The plastigel 16 and the sheets 6 and 10, on the application of heat, form a monolithic structure.

What is claimed is:

The method of lining a tank with polyvinyl chloride resin sheets which comprises skiving the vertical edges of the sheets, securing the sheets to the tank with the skived edges forming a V opening facing the inside of the tank, filling said V opening with a plastigel, and applying heat to the plastigel and surrounding polyvinyl chloride resin.

References Cited in the file of this patent

UNITED STATES PATENTS

| | | |
|---|---|---|
| 2,160,371 | Schnabel | May 30, 1939 |
| 2,362,026 | Quist | Nov. 7, 1944 |
| 2,392,734 | Haberstump | Jan. 8, 1946 |
| 2,421,096 | Vogt | May 27, 1947 |
| 2,467,340 | Seymour | Apr. 12, 1949 |
| 2,530,320 | Abraham, Jr. | Nov. 14, 1950 |